Patented Nov. 5, 1946

2,410,497

UNITED STATES PATENT OFFICE 2,410,497

DISINFECTING AND PRESERVING COMPOSITION

Winfrid Hentrich, Rodleben, near Dessau-Rosslau, and Wilhelm Kaiser, Dessau, Germany; vested in the Alien Property Custodian No Drawing. Application October 11, 1940, Serial No. 360,788. In Germany October 14, 1939

3 Claims. (Cl. 167—32)

The object of this invention is to provide a simple and feasible method for producing disinfectants and preservatives.

It has been found that excellent disinfectants and preservatives, which are as to their efficiency most superior to the usual phenols, can be obtained by treating 1-hydroxy-5,6,7,8-tetrahydronaphthalene or its 2-alkyl or 2-halogen substitution products with halogenating agents. In this case a halogen atom takes the 4-position of the initial material.

Hydroxy-tetrahydronaphthalenes, which may be used for the process are for example primarily 1-hydroxy-5,6,7,8-tetrahydronaphthalene, 1-hydroxy-2-methyl-5,6,7,8-tetrahydronaphthalene and 1-hydroxy-2-chloro-5,6,7,8-tetrahydronaphthalene as well as those substitution products of these compounds, which in 4-position contain groups replaceable by halogen such as sulfo, carboxyl, nitro or acylamino groups. As halogenating agents all those agents are suitable which usually are applied for the halogenation of phenols, for example: chlorine, bromine either liquid or in vapour form, iodine, mixtures of permanganate and hydrohalic acid, sulfuryl chloride, phosphorous oxychloride and the like. Into the non-substituted 1-hydroxy-5,6,7,8-tetrahydronaphthalene one or several halogen atoms may be introduced according to the amount of halogenating agents used. In applying sulfuryl chloride chiefly the halogenation in 4-position to the hydroxyl group is performed, so that the 4-chloro-1-hydroxy-5,6,7,8-tetrahydronaphthalene is obtained, which may be converted by further halogenating into a 4-chloro-2-halogen-1-hydroxy-5,6,7,8-tetrahydronaphthalene.

Example 660 parts by weight of 1-hydroxy-5,6,7,8-tetrahydronaphthalene (fusing point 65 to 67° C.) are dissolved in 1600 parts by weight of carbon tetrachloride and mixed within 3 hours with 660 parts by weight of sulfuryl chlorid at 30 to 40° C. Then the temperature is gradually raised and the reaction mass is finally heated in the reflux condenser for 2 hours up to boiling. Now by distilling off, the auxiliary stuffs are separated and the reaction product is distilled over at 175 to 180° C. under a Hg-pressure of 23 mm. It solidifies while cooling down to a colourless crystalline mass fusing after the recrystallising from benzine at 68 to 69° C. The yield of 1-hydroxy-4-chloro-5,6,7,8-tetrahydronaphthalene will be about 75% of the theory. Small amounts of 1-hydroxy-2-chloro-5,6,7,8-tetrahydronaphthalene may be obtained from the mother liquor of the benzine and may be converted by afterchlorinating into the 1-hydroxy-2,4-dichloro-5,6,7,8-tetrahydronaphthalene which will be obtained likewise by reacting greater amounts of sulfuryl chloride upon the 1-hydroxy-compound. The treatment of the 2-chloro-1-hydroxy-compound with bromine leads to the 1-hydroxy-2-chloro-4-bromo-5,6,7,8-tetrahydronaphthalene.

The aforesaid compounds are soluble in diluted alkali lyes, aqueous solutions of soaps and soap substitutes such as fatty alcohol sulfonates, organic solvents such as alcohol and the like. They may be applied either alone or mixed with other disinfecting media and optionally with an addition of diluents or inert ingredients for the disinfection of commodities, medical instruments, textiles, linen, walls, tiles, floors, implements, apparatus used in the food and spice products industry, as well as for the disinfecting of animals and parts of the human body. Moreover they are well adapted for the preserving of perishable animal and vegetable goods such as pastes and glues, furs, hides, skins and the like.

(a) A 0.02% solution of 1-hydroxy-4-chloro-5,6,7,8-tetrahydronaphthalene kills at 15° a deposit of bact. coli commun or of bact. staphylococcus aureus completely within 2.5 minutes.

(b) 0.01% 1-hydroxy-4-chloro-5,6,7,8-tetrahydronaphthalene added to a sugar solution preserves this solution against fermentation and mold.

(c) 0.01% 1-hydroxy-4-chloro-5,6,7,8-tetrahydronaphthalene are added to a steeping liquor for hides. The liquor and the hides steeped therein are preserved against decomposition.

We claim:

1. A disinfecting and preserving agent comprising a 1-hydroxy-5,6,7,8-tetrahydronaphthalene having a halogen substituent in the 4-position.

2. Process for the preserving of materials subject to deterioration against such deterioration which consists in adding to said materials 1-hydroxy-4-chloro-5,6,7,8-tetrahydronaphthalene.

3. A disinfectant composition containing 1-hydroxy-4-chloro-5,6,7,8-tetrahydronaphthalene.

WINFRID HENTRICH.
WILHELM KAISER.